Nov. 28, 1950          H. K. WEISS          2,531,957
REGENERATIVE TRACKING AND SMOOTHING DEVICE
Original Filed June 18, 1942

Inventor
HERBERT K. WEISS

By J. H. Church, W. E. Thibodeau + A. W. Dew
Attorneys

Patented Nov. 28, 1950

2,531,957

UNITED STATES PATENT OFFICE 2,531,957

REGENERATIVE TRACKING AND SMOOTHING DEVICE

Herbert K. Weiss, Joppa, Md.

Original application June 18, 1942, Serial No. 447,556, now Patent No. 2,433,006, dated December 23, 1947. Divided and this application September 4, 1947, Serial No. 772,038

8 Claims. (Cl. 235—61.5)

(Granted under the act of March 3, 1883, as amended April 30, 1928; 370 O. G. 757)

The invention described herein may be manufactured and used by or for the Government for governmental purposes, without the payment to me of any royalty thereon.

This application relates to apparatus for regenerating and smoothing data, and is a division of my copending application Serial No. 447,556, filed June 18, 1942, now Patent 2,433,006, granted December 23, 1947.

Computers for computing the lead angle of the gun in firing at a moving target require as input data, inter alia, (1) the present position of target, that is, the angular position of the instantaneous line of sight from director to target, relatively to fixed known base lines and (2) the angular rate at which such line is moving. These and other values are introduced into the director or computer which then continuously supplies lead angle data based upon the angle substended at the director by a distance measured along the forwardly extended path of the target (assumed to be pursuing a linear course) which distance is equal to the assumed constant speed of the target multiplied by the time of flight of the projectile to the future predicted target position.

Since the computed angles depend upon the accurate determination of the instantaneous position of the line from director to target, it is highly important that the sight or radar, be moved to accurately track the target and a great deal of inventive effort has been expended in the development of power-driven mechanism which will, after a short period of manual tracking, automatically maintain the sight upon the target so long as the speed and course of the latter remain unchanged. Such mechanisms are called regenerative trackers.

It is accordingly a principal object of the invention to provide a regenerative tracker which operates upon the exact trigonometrical principles involved and which is manually controlled in accordance with a single variable only, namely, the instantaneous range.

A further object is to provide a regenerative tracking apparatus as in the foregoing paragraph wherein the operation of a remote tracker is smoothed and transmitted to any desired apparatus such as a computer.

A still further object is to provide a tracker which may be controlled by any well known electric telemeteric system and which operates to afford smoothed versions of input, corrected for any lag in the system.

Other objects and advantages of the invention will become apparent after a study of the following description in connection with the drawing, wherein.

Figure 2:
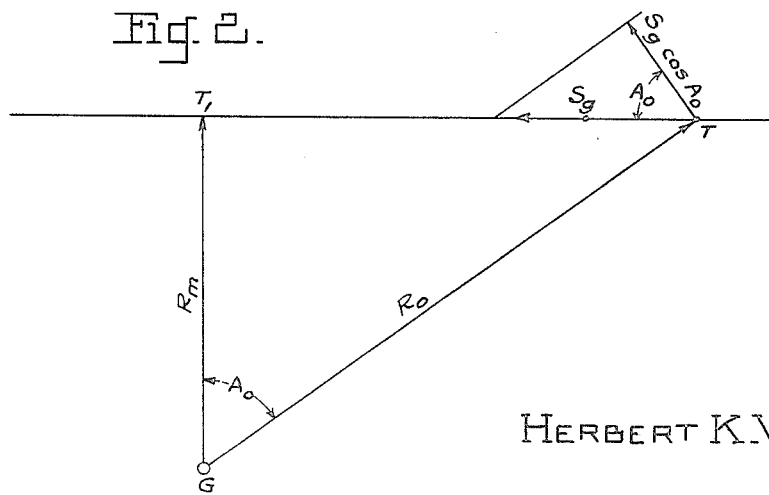
Figure 2 is a diagram showing the principle utilized by the instrument.

Referring first to Figure 2, let G represent the location of the gun and director and T—T₁ the path extended forwardly from the present position T, of a target having a velocity $Sg$. Let $GT_1 = Rm$ or minimum range of the target path from the gun and $GT = R_0$ or present range.

Let $\Sigma_a$ equal the apparent rate of angular travel of the target in azimuth in radians per second.

Then, in the velocity triangle $$\Sigma_a = \frac{Sg \cos A_0}{R_0}$$

But $\cos A_0 = Rm/R_0$, hence $$\Sigma_a = \frac{SgRm}{R_0^2}$$

which means that if under the conditions of target travel noted, a sight or radar can be moved in azimuth at a rate proportional to the product of the target's ground speed and minimum range, divided by the square of its present, or instantaneous range, the line of sight will remain upon the target so long as the latter maintains unaccelerated flight. Under such conditions the operator need only effect adjustments as they are required by changes in speed or course of the target.

Figure 1:
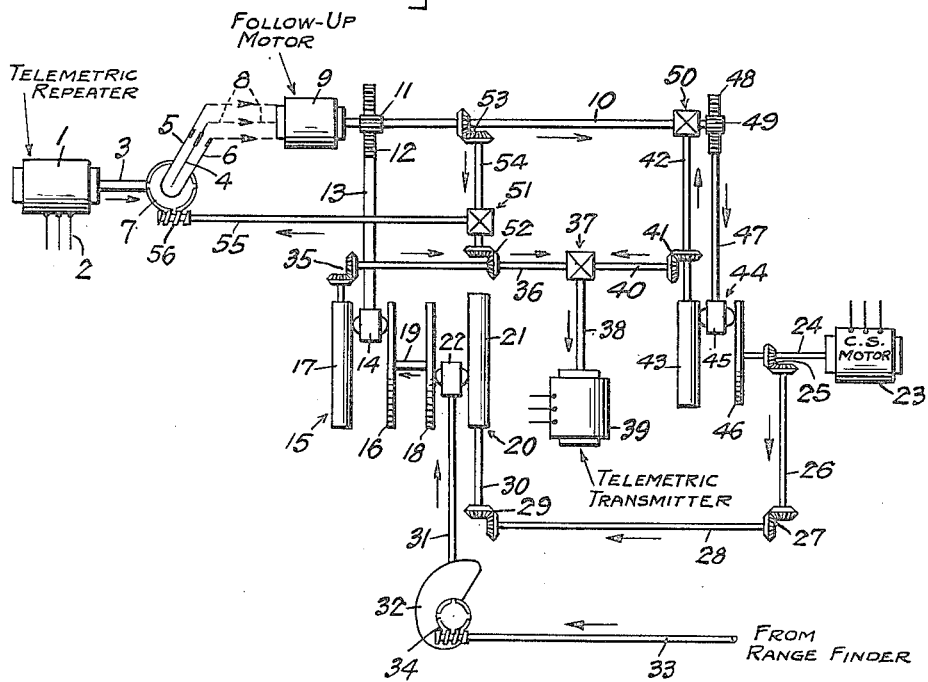
Figure 1 is a schematic view showing the invention.

At Figure 1 I have shown one form of mechanism for smoothing an angular input, correcting smoothed version for lag, and retransmitting to a desired location such as to a lead angle computer. In this figure, I represents a synchronous electric telemetric repeater of known design, controlled over wires 2 from a remote transmitter which may be connected for operation by the azimuthal movement of a tracking device in tracking a target. This repeater drives a shaft 3 connected as by bevel gears to pivot a follow-up contact 4 between two contacts 5 and 6 fixedly mounted and spaced upon a worm gear 7. Leads 8 extend from the respective contacts 4, 5 and 6 to a follow-up motor 9 connected to drive a shaft 10. The connections are such that when contacts 4 and 5 are in engagement, motor 9 rotates in one direction while, when 4 and 6 are in engagement, the motor rotates in the opposite direction.

A pinion 11 on shaft 10 meshes with a rack 12 on one end of a rod 13, the other end of which is connected with the speed-varying element 14 of a conventional variable speed device 15 including a driving disc 16 and a driven roller 17. Disc 16 is coupled in series by means conventionally shown as a shaft 19 for rotation with the driven disc 18 of a second variable speed drive 20, including a driven roller 21 and a speed varying element 22. Roller 21 is driven from a constant speed motor 23 by a drive conventionally shown as a shaft 24, bevel gears 25; shaft 26, bevel gears 27, shaft 28, bevel gears 29 and shaft 30 connected to roller 21.

Speed varying element 22 is connected with a rod 31 having one end engaging a cam 32. This cam is driven from a range finder, not shown, by a conventional drive such as a shaft 33 and worm and gear 34. The cam 32 is shaped to give a lift to rod 31 proportional to $R_o^2$, when rotated in proportion to $R_o$. The relation of the parts as shown, is such that element 22 is moved radially inwardly of disk 18 for increasing values of $R_o$. Thus disks 16 and 18 are driven at a rate inversely proportional to $R_o^2$, that is, proportional to $1/R_o^2$. Since speed varying element 14 is adjusted radially of disk 16 by motor 9 substantially in proportion to the angular position relatively to a fixed base line, of the line from the director to target, when correctly positioned to maintain the tracking device upon the target, element 14 has a radial adjustment proportional to $SgRm$ in accordance with the equation previously developed.

Thus the output roller 17 is driven at a rate proportional to $SgRm/R_o^2$. This output rate is conveyed by bevel gears 35, shaft 36 to one side of differential 37, having its center connected by shaft 38, to a telemetric transmitter 39. The other side of differential 37 is connected by shaft 40, bevel gears 41 and shaft 42, to output roller 43 of a variable speed drive 44 including speed-varying element 45 and disk 46. Disk 46, as shown, is fixed to shaft 24 and driven by motor 23.

Element 45 is adjusted radially of disk 46 by a rod 47 having a rack 48 on its other end. This rack meshes with and is driven by a pinion 49 connected with one side of a differential 50. A second side of this differential is connected with shaft 10, and its center with shaft 42.

A differential 51 has one side driven by shaft 36 through bevel gearing 52 and a second side by shaft 10 over bevel gearing 53 and shaft 54. The third side or center of differential 51 is connected to rotate worm gear 7 by way of shaft 55 and worm 56.

With motor 23 operating, and ball cage elements 14 and 45 at the center of their respective disks, the range finder is coupled to shaft 33. Element 22 is thereby adjusted radially in accordance with $R_o^2$. Since element 14 is at this time at the center of disk 16, roller 17 is at rest. When signals are received by repeater 1 over lines 2 from a remote tracking device the repeater is rotated proportionally to the angular movement of the device as it is operated to follow the target. The motor thus operates contact 4 to engage contact 5 or 6 and thus cause follow-up motor 9 to rotate in a corresponding direction. Motor 9 then rotates shaft 10 and pinion 11 and adjusts element 14 outwardly of disk 16. Roller 17 now begins to turn and its motion is transmitted to contacts 5 and 6 by way of gears 35, shaft 36, gears 52, differential 51, shaft 55, worm 56 and gear 7, the connections being such as to move contacts 5 and 6 in a direction tending to centralize contact 4 between 5 and 6. However, the contact previously made will continue and motor 9 will continue to operate, until ball cage element 14 has been adjusted to a position such that contacts 5 and 6 are rotated at the same rate as contact 4. When this occurs, contact is broken and motor 9 and shafts 10 and 54 stop. Simultaneously with the previously described operation, the motion of shaft 36 is imparted to differential 37 and thus to transmitter 39 whose motion will then be a substantially correct smoothed version of repeater 1 at a rate which is proportional to $SgRm/R_o^2$.

Since there may be an appreciable lag between the instantaneous position of repeater 1 and motor 9 which may affect the output, connections shown and whose operation is now described are provided to compensate and correct for this lag. Thus with the parts initially at rest as previously described, as soon as shaft 10 begins to turn under the influence of motor 9, the motion is conveyed by gearing 53 and shaft 54 to differential 51 where it is added to the motion coming from shaft 36. As a result, contacts 5 and 6 are advanced ahead of the position they would have in the absence of gearing 53 and shaft 54, and the motion of contacts 5 and 6 into synchronism with contact 4 is brought about sooner than would otherwise occur. As soon as synchronism has been established, motor 9 stops and the operation of contacts 5 and 6 is effected solely by variable speed drive 15.

Simultaneously a rate represented by motion of shaft 10, is developed at variable speed drive 44. Just prior to the start of operation of shaft 10, element 45 is at the center of disk 46 so that roller 43 is at rest, as well as shafts 40 and 42. As shaft 10 picks up motion, it drives through differential 50 to correspondingly operate pinion 49 and displace element 45 radially of disk 46. Roller 43 now begins to turn and its motion is conveyed by shaft 42, gears 41 and shaft 40 to differential 37; and by shaft 42 to differential 50. This operation continues until the rate of shaft 42 matches or is equal to that of shaft 10, whereupon pinion 49 comes to rest and further radial adjustment of element 45 ceases. Thereby, a rate is developed equal to the rate of motion of shaft 10 and this rate is added at differential 37 to the rate coming thereto over shaft 36. The sum of the two rates is then effective on transmitter 39 whereby compensation is effected for the lag of motor 9 relatively to repeater 1. When full synchronism is effected between contact 4 on the one hand, and 5 and 6 on the other, motion of shaft 10 ceases, element 45 is restored to its initial position centrally of disk 46, and motion of shafts 42 and 40 ceases. All motion to transmitter 39 then comes from variable speed drive 15 and shaft 36 only.

For clarity of explanation, the various movements have been described separately. Actually, however, it will be readily apparent that the various functions take place simultaneously and smoothly so that the rate transmitted by transmitter 39 is at all times a closely exact smoothed version of the operation of the target tracking rate. Consequently the output of transmitter 39 may be used to repeat back and drive tracking sight or radar and/or conveyed to a director or computer as one of the required inputs thereto. Furthermore, when a change in the tracking rate occurs as will be occasioned by a change in target speed or course, or by picking up a different target, the instrument responds rapidly to the new rate without appreciable lag.

I have thus provided an instrument which may constitute an intermediate unit for location between a tracking device, such as a radio locator, and a computing device. However, the instrument might be built integral with either. Azimuth tracking data which might be, and often are, quite irregular as produced by errors of the tracking device are received and duplicated by repeater 1, and smoothed according to the principle explained herein. The smoothed, and therefore improved, data are transmitted to the computing unit which performs the prediction and ballistic transformations. In the claims, the expression "adjusting a variable speed drive" or like words, means an adjustment which varies the speeds rates between the input and output thereof.

While I have shown and described a preferred form of the invention as now known to me, various modifications, substitutions and rearrangements of parts will readily occur to those skilled in the art after a study of the present disclosure. For that reason, the disclosure should be taken in an illustrative rather than a limiting sense; and all such changes as fall within the scope of the subjoined claims are reserved.

Having now fully disclosed the invention, what I claim and desire to secure by Letters Patent is:

1. In a remote controlled regenerative tracking and smoothing device, a repeater, a follow-up motor, first contact means controlled by said repeater, first and second variable speed drives, means connecting said first drive for operating by the output of said second drive, means adjusting said second drive in accordance with the square of the range of a target being tracked, means adjusting said first variable speed drive in response to operation of said follow-up motor, a differential, means connecting two sides of said differential to the output of said first variable speed drive and said follow-up motor, respectively, second contact means cooperating with said first contact means to control said motor, means drivingly connecting the third side of said differential to said second contact means, and a transmitter drivably connected with the output of said first variable speed drive.

2. In an apparatus for smoothing and transmitting the angular movement of a tracking device as the latter is manually moved to track a target, a repeater, a follow-up motor, first and second contact devices relatively movable and cooperating to control the direction of motion of said follow-up motor, a first driving connection between said repeater and said first contact device, a second driving connection between said follow-up motor and said second contact device and including a first differential, first and second variable speed drives connected in series, means adapted to be driven by a range finder to adjust said second variable speed drive proportional to the square of the range output of said finder, means adjusting said first variable speed drive in response to operation of said motor, a second differential, means drivingly connecting the output of said first variable speed drive to one side of each of said first and second differentials, a transmitter connected to be driven by a second side of said second differential, variable speed means operable to produce an output movement having a rate proportional to the rate of movement of said motor, and means driving a third side of said second differential by and in accordance with said output movement.

3. In an apparatus for smoothing and transmitting the angular movement of a remote tracking device as the latter is moved to track a target, a repeater adapted to be rotated in response to angular movement of said device, a follow-up motor, first and second electrical contact means cooperable to control the direction of rotation of said motor, means connecting said first contact means for movement by said repeater, means including a first differential connecting said follow-up motor to said second contact means, first and second variable speed devices, means adjusting said second device to produce an output inversely proportional to the square of the range of a target being tracked, means driving said first variable speed device by the output of said second variable speed device, means adjusting said first variable speed device by and in proportion to the operation of said motor, a second differential, a driving connection between the output of said first variable speed drive and one side each of said first and second differentials, a third variable speed device, a third differential, having one side driven by said motor and a second side connected to vary the speed ratio of said third variable speed device, and a driving connection from the output of said third variable speed device to one side each of said second and third differentials.

4. The apparatus as claimed in claim 3, a single constant speed motor, and driving connections from said motor to said second and third variable speed drives.

5. In an apparatus for smoothing and transmitting angular movement of a tracking device in following a target, a first shaft, a second shaft, a first differential interconnecting said shafts, a follow-up motor for operating said first shaft, reversing follow-up contacts for controlling the direction of rotation of said motor, first, second and third variable speed drives of the disk, ball and cylinder type, a constant speed motor drivingly interconnected with the disk of said third and the cylinder of said second variable speed drives, means for adjusting the balls of said first variable speed drive in response to rotation of said first shaft, a cam, means for rotating said cam, means displacing the balls of said second variable speed drive in response to rotation of said cam, means drivingly interconnecting the disks of said first and second variable speed drives, means for displacing the balls of said third variable speed drive in response to rotation of said second shaft, second and third differentials, means drivingly interconnecting at least one of said contacts with said first shaft through said second differential, means drivingly connecting the cylinder of said first variable speed drive with said second and third differentials, means drivingly connecting the cylinder of said third variable speed drive with said first and third differentials, a transmitter, and means connecting said third differential and transmitter in driving relation.

6. An apparatus for smoothing and transmitting the angular movement of a tracking device as the latter is moved to track a target in rectilinear motion, a repeater, a follow-up power means, an output shaft driven by said power means, variable speed means having an output member, means including a part adjusted by said shaft to vary the output speed of said member in accordance with $$\frac{S_g R_m}{R_0^2}$$

where $S_g$ is the speed of said target, $R_m$ is the minimum range from said device of the forwardly extended path of the target, and $R_0$ is the instantaneous range of the target, a differential having sides driven respectively by said shaft and member, control means for said follow-up power means comprising two relatively movable parts controlled respectively by said repeater and the third side of said differential, and transmitter means driven by said member.

7. An apparatus as recited in claim 6, a second variable speed means, means responsive to movement of said shaft to adjust said second variable speed means and produce an output movement thereof proportional to the movement of said shaft, a second differential, connections from both said variable speed means to respective sides of said differential, and a drive from the third side of said differential to said transmitter means.

8. In an apparatus for smoothing the angular movement of a tracking device in following a target moving in a rectilinear path relatively to a predetermined location, a squaring cam, means for rotating said cam in accordance with the range of the target to produce a lift proportional to the square of said range, a part adapted to be actuated proportional to a factor equal to the product of speed of the target and minimum range of said path from said location, a first variable speed drive having its speed-varying element connected to be operated by said part, a second variable speed drive having its speed-varying element connected for operation by said cam to produce an output rate proportional to the reciprocal of said lift, means driving the input of said first variable speed drive from the output of said second variable speed drive, a third variable speed drive having its speed-varying element connected to be operated by said part, to produce a lag correction output, differential means responsive to, and algebraically combining the outputs of said first and third variable speed drives, to produce a resultant output, and transmitter means connected for operation by the resultant output of said differential means.

HERBERT K. WEISS.

REFERENCES CITED

The following references are of record in the file of this patent:

UNITED STATES PATENTS

| Number | Name | Date |
| --- | --- | --- |
| 2,377,898 | Myers | June 12, 1945 |
| 2,378,910 | Chaffee et al. | June 26, 1945 |
| 2,433,006 | Weiss | Dec. 23, 1947 |

FOREIGN PATENTS

| Number | Country | Date |
| --- | --- | --- |
| 350,955 | Great Britain | June 11, 1931 |